United States Patent
Rácz et al.

(10) Patent No.: US 9,479,959 B2
(45) Date of Patent: Oct. 25, 2016

(54) TECHNIQUE FOR AGGREGATING MINIMIZATION OF DRIVE TEST, MDT, MEASUREMENTS IN A COMPONENT OF AN OPERATING AND MAINTENANCE, OAM, SYSTEM

(71) Applicant: Telefonaktiebolaget L M Ericsson (publ), Stockholm (SE)

(72) Inventors: András Rácz, Budapest (HU); Robert Petersen, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/782,194

(22) PCT Filed: Apr. 5, 2013

(86) PCT No.: PCT/EP2013/057213
§ 371 (c)(1),
(2) Date: Oct. 2, 2015

(87) PCT Pub. No.: WO2014/161599
PCT Pub. Date: Oct. 9, 2014

(65) Prior Publication Data
US 2016/0037371 A1    Feb. 4, 2016

(51) Int. Cl.
*H04W 24/00* (2009.01)
*H04W 24/10* (2009.01)
(Continued)

(52) U.S. Cl.
CPC ............. *H04W 24/10* (2013.01); *H04W 24/08* (2013.01); *H04W 84/042* (2013.01)

(58) Field of Classification Search
None
See application file for complete search history.

(56) References Cited

U.S. PATENT DOCUMENTS

| 2014/0200016 A1* | 7/2014 | Siomina | H04W 24/08 455/450 |
| 2015/0094102 A1* | 4/2015 | Jung | H04W 24/02 455/456.6 |

FOREIGN PATENT DOCUMENTS

WO    2012110054 A1    8/2012

OTHER PUBLICATIONS

Unknown, Author, "3GPP TR 32.836 V0.4.0", 3rd Generation Partnership Project; Technical Specification Group Services and System Aspects; Telecommunication management; Study on NM Centralized Coverage and Capacity Optimization (CCO) SON Function (Release 12), Jan. 2013, pp. 1-14.

(Continued)

*Primary Examiner* — Diane Mizrahi
(74) *Attorney, Agent, or Firm* — Murphy, Bilak & Homiller, PLLC

(57) ABSTRACT

A technique for aggregating Minimization of Drive Test, MDT, measurements is disclosed. In a first method aspect, the method is performed by a component of an Operation And Maintenance, OAM, system and comprises the steps of receiving an activation request configuring MDT measurements for a plurality of User Equipments, UEs, and requesting a Performance Measurement, PM, activating the MDT measurements for the UEs, receiving the MDT measurements from the UEs, and aggregating the MDT measurements to obtain the requested PM measurement. In a second method aspect, the method is performed in another component of the OAM system and comprises the steps of generating the activation request configuring MDT measurements for the plurality of UEs, and requesting the PM, and transmitting the activation request towards the component of the OAM system.

17 Claims, 3 Drawing Sheets

(51) Int. Cl.
*H04W 24/08* (2009.01)
*H04W 84/04* (2009.01)

(56) References Cited

OTHER PUBLICATIONS

Unknown, Author, "3GPP TR 32.836 V0.5.0", 3rd Generation Partnership Project; Technical Specification Group Services and System Aspects; Telecommunication management; Study on NM Centralized Coverage and Capacity Optimization (CCO) SON Function (Release 12), May 2013, pp. 1-16.
Unknown, Author, "3GPP TS 32.401 V11.0.0", 3rd Generation Partnership Project; Technical Specification Group Services and System Aspects; Telecommunication management; Performance Management (PM); Concept and requirements (Release 11), Sep. 2012, pp. 1-29.
Unknown, Author, "3GPP TS 32.405 V11.2.0", 3rd Generation Partnership Project; Technical Specification Group Services and System Aspects; Telecommunication management; Performance Management (PM); Performance measurements; Universal Terrestrial Radio Access Network (UTRAN) (Release 11), Sep. 2014, pp. 1-189.
Unknown, Author, "3GPP TS 32.421 V11.6.0", 3rd Generation Partnership Project; Technical Specification Group Services and System Aspects; Telecommunication management; Subscriber and equipment trace; Trace concepts and requirements (Release 11), Mar. 2013, pp. 1-38.

Unknown, Author, "3GPP TS 32.422 V11.7.0", 3rd Generation Partnership Project; Technical Specification Group Services and System Aspects; Telecommunication management; Subscriber and equipment trace; Trace control and configuration management (Release 11), Mar. 2013, pp. 1-134.
Unknown, Author, "3GPP TS 32.425 V11.4.0", 3rd Generation Partnership Project; Technical Specification Group Services and Systems Aspects; Telecommunication management; Performance Management (PM); Performance measurements Evolved Universal Terrestrial Radio Access Network (E-UTRAN) (Release 11), Dec. 2012, pp. 1-70.
Unknown, Author, "Aggregation of Measurements for CCO Use Cases", 3GPP TSG SA WG5 (Telecom Management) Meeting #88, S5-130573, Qingdao, China, Apr. 15-19, 2013, pp. 1-2.
Unknown, Author, "Aggregation of Measurements for CCO Use Cases", 3GPP TSG SA WG5 (Telecom Management) Meeting #88, S5-130791, Qingdao, China, Apr. 15-19, 2013, pp. 1-2.
Unknown, Author, "Discussion on Architecture for MDT", 3GPP TSG-RAN WG2 #67bis, Tdoc R2-095779, Miyazaki, Japan, Oct. 12-16, 2009, pp. 1-4.
Unknown, Author, "UID_510046 Study on Management of Heterogeneous Networks Rapporteur Report", 3GPP TSG SA WG5 (Telecom Management) Meeting #81, S5-120046, Dresden, Germany, Feb. 6-10, 2012, 1 page.
Unknown, Author, "Way Forward for Minimization of Drive Test", 3GPP TSG-RAN WG2 #67, R2-094582, Shenzhen, China, Aug. 24-26, 2009, pp. 1-4.

* cited by examiner

TECHNIQUE FOR AGGREGATING MINIMIZATION OF DRIVE TEST, MDT, MEASUREMENTS IN A COMPONENT OF AN OPERATING AND MAINTENANCE, OAM, SYSTEM

TECHNICAL FIELD

The present disclosure generally relates to aggregating Minimization of Drive Test (MDT) measurements in a component of an Operating And Maintenance (OAM) system.

BACKGROUND

There are standardized solution for MDT data collection as specified, for instance, in $3^{rd}$ Generation Partnership Project Technical Specification (3GPP TS) 32.422 and related specifications in a cellular system, which has a management architecture as described in FIG. 1 (which is an excerpt from 3GPP TS 32.101). MDT is also specified for Universal Mobile Telecommunications System (UMTS) and Long Term Evolution (LTE) systems in 3GPP.

FIG. 1 shows an example management architecture for MDT data collection. Accordingly, as shown in FIG. 1, the architecture comprises a network 100, which in turn comprises organizations A and B, of which only organization A is exemplified. Boxes denote functional entities (such as "Enterprise Systems"), and numerals 1 to 6 on the connections drawn between the boxes denote interfaces between the functional entities.

Data collection for MDT function is, for instance, ordered via the Itf-N (interface numeral 2 in FIG. 1) from a Network Manager (NM) 1002 to a Domain Manager 1001a /Element Manager 1001b (DM/EM), which in turn orders a Network Element (NE) 1001 to perform the MDT data collection according to the request originating from the NM 1002. The MDT data collection can be ordered from the NM 1002 using the trace functionality as specified, for instance, in TS 32.422. The MDT data collection can be ordered for a specific subscriber or terminal, identified by the International Mobile Subscriber Identity/International Mobile Equipment Identity (IMSI/IMEI) (also called signaling based MDT trace) or for a specific area, i.e., set of cells (also called area based MDT or management based trace).

As some pieces of the data collected during an MDT session may be sensitive from a privacy point of view, a user consent indicator is configured per subscriber in the Home Subscriber Server (HSS) or Home Location Register (HLR). The user consent indicator is propagated in the signaling control chain (interface 6 in FIG. 1) to the NE 1001 (in case of signaling-based MDT trace) or via the management interface from DM 1001a to the NE (interface 1 in FIG. 1) (in case of management-based MDT). The NE 1001 carries out the selection of UEs (not shown) that should participate in the MDT data collection.

When a MDT data collection order (trace order configuration) is received in the NE 1001, NE 1001 checks for sessions that fulfill the criteria from the MDT order. When such a session is found, the NE 1001 checks the user consent indicator for that session. Only if the user consent is set to that MDT collection being allowed, the NE 1001 starts the MDT data collection for that session.

There are different types of MDT:
1. Area-based MDT: The MDT order is for a specified area typically for a cell or list of cells.
2. Signaling-based MDT: The MDT order is for a specified user (IMSI) or User Equipment (UE identified by IMEI).
3. Logged MDT: The MDT data collection is performed for UEs that are in idle mode.
4. Immediate MDT: The MDT data collection is performed for UEs that are in active mode.

The types 1 and 2 as well as 3 and 4 are mutually exclusive, while types 1 and 2 are combinable with 3 or 4.

Accordingly, the standard depicted above defines different trace job types depending on whether immediate or logged MDT measurements are requested, with combination of regular trace, etc. The current values of the traceJob type as follows (see TS 32.422 for the jobType parameter).

The jobType is a conditional mandatory parameter. The condition is either MDT or Radio Link Failure (RLF) data collection functionality being supported. It defines whether a single trace job, a combined MDT and trace job or RLF report collection job is activated. This parameter also defines the MDT mode. The jobType parameter is an Enumerated type with the following values:
Immediate MDT only (0);
Logged MDT only (1);
Trace only (2);
Immediate MDT and Trace (3);
RLF reports only (4).
NOTE: The jobType "RLF reports only" is applicable only in management-based trace activation in Evolved UMTS Terrestrial Radio Access Network (E-UTRAN).

The standard also defines PM measurements, which are measurements aggregated to cell level and thereby used to denote the overall cell level performance, instead of the individual UE level performance as in the case of MDT data, see for instance TS 32.425 for E-UTRAN PM measurements and 32.405 for UTRAN measurements and TS 32.401 for the overall concept and requirements for PM measurements.

The PM measurements are produced by the Network Elements (NE) 1001 and are collected by the Element Manager (EM) and finally transferred via the standardized Itf-N interface (see FIG. 1). The standard defines a variety of PM measurements, including such as success rate of connection setups, radio bearer setups or average cell throughput, utilization, etc.

In all cases, the PM measurements are produced by aggregation of individual measurement samples, where there is a given set of aggregation "functions" defined in the standard (e.g., cumulative, gauge, etc.).

Existing Problems Not Realized by the Prior Art

In current 3GPP networks (such as UMTS or LTE), there is possibility for an Operation and Maintenance (OAM) system to collect MDT measurements from UEs and from the network for network observation and optimization purposes. The MDT measurements are collected via the trace mechanism and are stored in the trace files, which are transferred from the network to a Trace Collection Entity (TCE). The amount of MDT data in the trace files can be significant, requiring large storage and processing resources. Moreover, for some use cases, the MDT data might be unnecessarily detailed. Therefore, there is a need to support the aggregated reporting of MDT data in terms of PM measurements (e.g., PM counters).

The current MDT trace mechanism supports the collection of MDT measurements in trace format only, i.e., where all individual samples are collected. For some use cases, this may represent an overwhelming amount of data, which may anyway be aggregated in the OAM system for the particular use case. That is, transferring all the detailed MDT data from the NE 1001 to OAM system may be unnecessary in those cases. On the other hand, there exist PM measurements (counters), which collect measurements in an aggregated way and MDT measurement samples would be a useful input for a number of new PM measurements. However, defining only new PM measurements would not be sufficient alone, as no mechanisms exist that would configure and trigger the required measurements at UEs (e.g., MDT measurements) and thereby no measurement samples would be produced for the PM counters.

SUMMARY

Accordingly, there is a need for an implementation of a scheme that avoids one or more of the problems discussed above, or other related problems.

In a first aspect, there is provided a method of operating a component of an Operation And Maintenance, OAM, system, the method comprising receiving an activation request configuring Minimization of Drive Test, MDT, measurements for a plurality of User Equipments, UEs, and requesting a Performance Measurement, PM, activating the MDT measurements for the UEs, receiving the MDT measurements from the UEs, and aggregating the MDT measurements to obtain the requested PM measurement. In this way, the features of MDT and PM are combined in a synergistic manner to use an MDT activation request as a means to transport PM measurements.

In a first refinement of the first aspect, the activation request may comprise a job type parameter signalling the PM measurement request. If so, the activation request may further comprise the request to report the MDT measurements on a non-aggregated per-UE basis. In both cases, the activating may further comprise activating the MDT measurements for specific UEs according to the measurement configuration indicated in an MDT trace job. The received MDT measurement samples may be aggregated into PM measurements and reported as PM measurements to the OAM system. As an alternative, the received MDT measurements may be reported on a non-aggregated per-UE basis as an MDT trace file to the OAM system, in addition to being reported as PM measurements. In this way, it is always ascertained that the best-fitting container is used as the means for transporting.

In a second refinement of the first aspect, there may be only one MDT trace job with the job type parameter "PM measurement request" or "PM measurement and MDT measurement" requested to be active at the same time in the same cell. If so, measurement samples from different MDT trace jobs are prevented to be mixed up.

In a third refinement of the first aspect, multiple MDT trace jobs for PM measurements may be allowed to be activated in parallel. If so, the MDT trace job activation request for PM measurements may include an identity to uniquely identify the MDT trace job measurement configuration for PM measurements. In the latter case, separate PM measurements may be defined for each possible MDT trace job measurement configuration identity. Additionally or alternatively, the MDT measurements samples corresponding to the MDT trace job configuration with the particular identity may be received and aggregated into the PM measurements of the same identity. In this way, versatility of the first aspect can be enhanced.

In a fourth refinement of the first aspect, the MDT measurements may be activated for UEs in a specified area. If so, the MDT measurements may be activated for all UEs in the specified area irrespective of their user consent status. Additionally or alternatively, the specified area may comprise one or more cells of a cellular communication network. In this way, aggregating the MDT measurements may be accelerated, provided that user privacy remains unharmed.

In a fifth refinement of the first aspect, the activation request may comply with $3^{rd}$ Generation Partnership Project Technical Specification, 3GPP TS, 32.422. In a sixth refinement, the method may further comprise reporting the PM measurement. In the latter case, the PM measurement and the PM measurement report may comply with at least one of $3^{rd}$ Generation Partnership Project Technical Specification, 3GPP TS, 32.425, 32.405 and 32.401. In this way, mutual technological acceptance is assured.

In a second aspect, there is provided a method of operating a component of an Operation And Maintenance, OAM, system, the method comprising generating an activation request configuring Minimization of Drive Test, MDT, measurements for a plurality of User Equipments, UEs, and requesting a Performance Measurement, PM, and transmitting the activation request towards another component of the OAM system. In this way, the method of the first aspect is augmented with the source of the MDT activation request.

In a first refinement of the second aspect, the method may further comprise receiving the requested PM measurement.

In a third aspect, there is provided a computer program product comprising program code portions for performing the steps of any of the first and second aspects when the computer program product is executed by a computing device. The computer program product may be stored on a computer-readable recording medium.

In a fourth aspect, there is provided a component of an Operation And Maintenance, OAM, system, the component comprising a first interface adapted to receive an activation request configuring Minimization of Drive Test, MDT, measurements for a plurality of User Equipments, UEs, and requesting a Performance Measurement, PM, a second interface adapted to activate the MDT measurements for the UEs, a third interface adapted to receive the MDT measurements from the UEs, and a processor adapted to aggregate the MDT measurements to obtain the requested PM measurement.

In a first refinement of the fourth aspect, the component may be configured as an OAM Network Element or a Network Element. Additionally or alternatively, the component may be configured as one of an eNodeB, a Radio Network Controller, RNC, a Domain Manager, DM, and an Element Manager, EM.

In a fifth aspect, there is provided a component of an Operation And Maintenance, OAM, system, the component comprising a processor adapted to generate an activation request configuring Minimization of Drive Test, MDT, measurements for a plurality of User Equipments, UEs, and requesting a Performance Measurement, PM, and an interface adapted to transmit the activation request towards another component of the OAM system.

In a first refinement of the fifth aspect, the component may be configured as an OAM Network Manager or a Network Manager.

Still further, it is to be noted that the method aspects may also be embodied on the apparatus of the fourth and fifth aspects comprising at least one processor and/or appropriate means for carrying out any one of the method steps.

Finally, in a sixth aspect, there is provided an Operating And Maintenance, OAM, system comprising the component of the fourth aspect and the component of the fifth aspect.

BRIEF DESCRIPTION OF THE DRAWINGS

The embodiments of the technique presented herein are described herein below with reference to the accompanying drawings, in which.

DETAILED DESCRIPTION

In the following description, for purposes of explanation and not limitation, specific details are set forth (such as particular signaling steps) in order to provide a thorough understanding of the technique presented herein. It will be apparent to one skilled in the art that the present technique may be practiced in other embodiments that depart from these specific details. For example, the embodiments will primarily be described in the context of the OAM architecture; however, this does not rule out the use of the present technique in connection with (future) technologies consistent with the OAM architecture e.g. in UMTS, LTE or LTE-Advanced (LTE-A).

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Without loss of generality, the present disclosure may be summarized as being based on an extension of the management based MDT trace functionality such that an MDT trace job would be possible to initiate without trace file reporting, in which case the collected MDT measurement samples would be used to produce PM measurements in the NE, i.e., the NE would report only the PM measurements. This would require introducing new MDT trace job type(s) on Itf-N to indicate when MDT measurements shall be collected for PM purposes only without trace file reporting. Correspondingly, there is a need to define the associated NE behaviors in case of the new job type(s).

Figure 1:
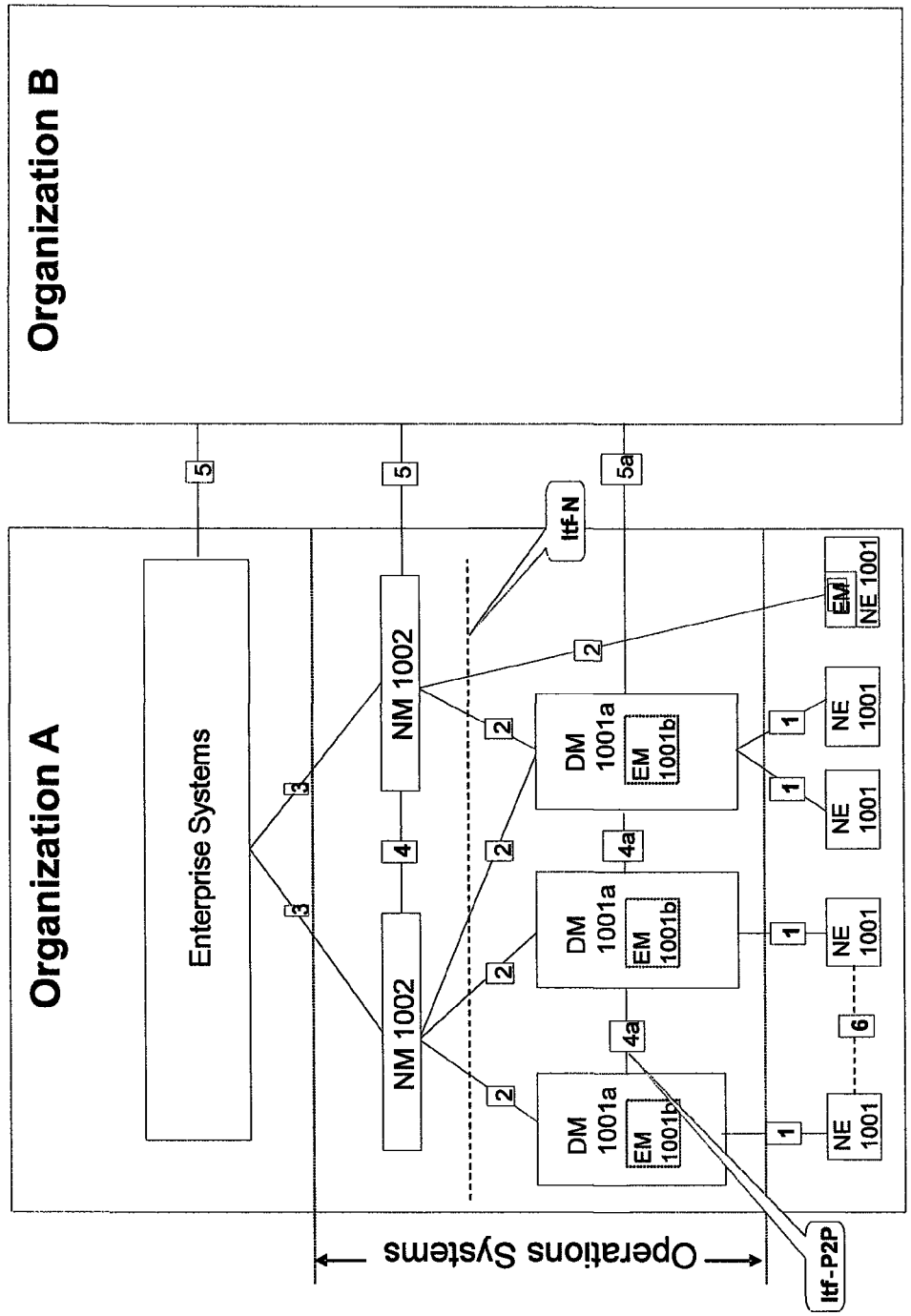
FIG. 1 shows an example management architecture for MDT data collection.
Figure 2:
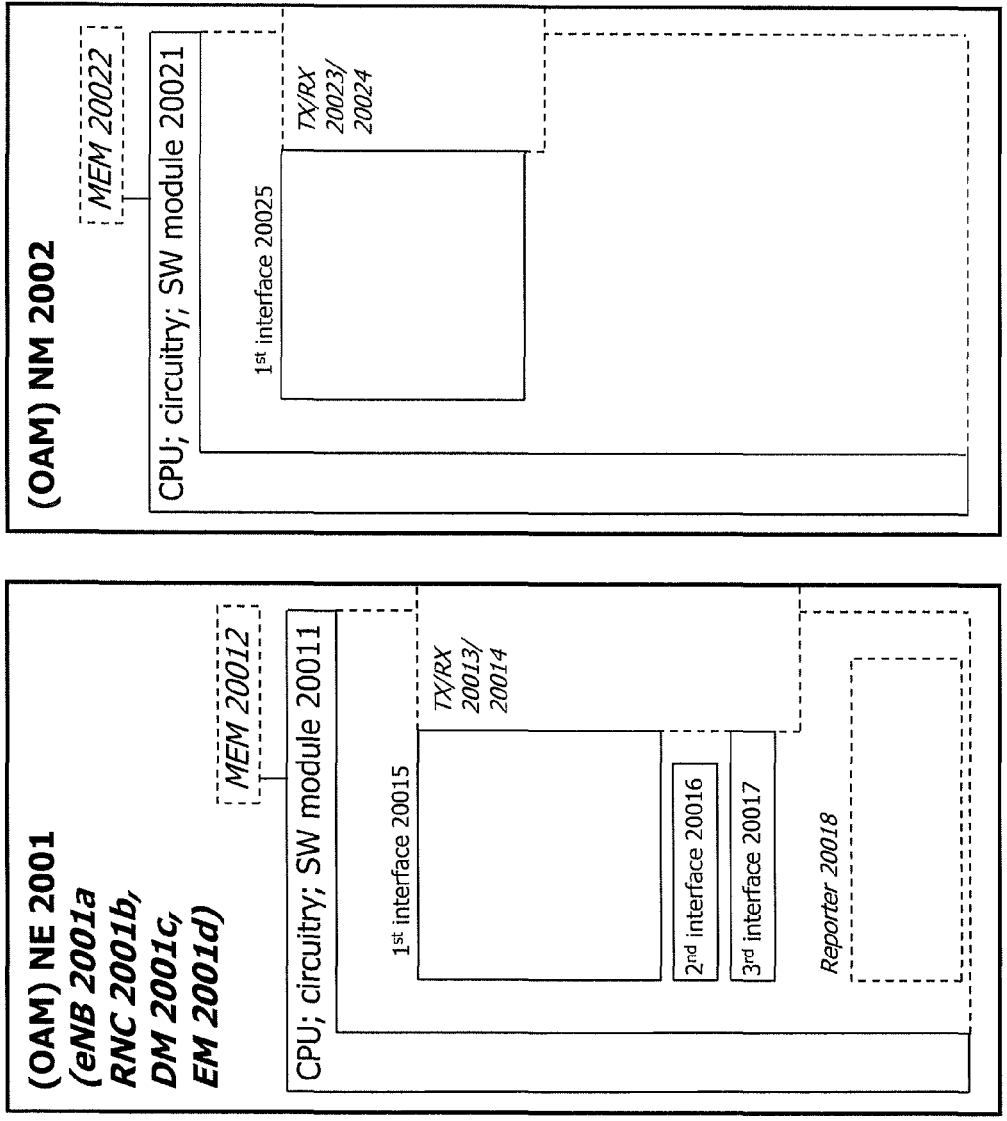
FIG. 2 shows components comprised in an exemplary device embodiment realized in the form of an (OAM) Network element or an (OAM) Network Manager.

FIG. 2 shows components comprised in an exemplary device embodiment realized in the form of an (OAM) Network Element (NE) 2001 (as an example of the first component) and/or an (OAM) Network Manager (NM) 2002 (as an example of the second component). It is noted that the terms OAM NE/NM and NE/NM are equivalent and are used interchangeably throughout the description. As non-limiting examples, the OAM NE 2001 may be embodied on an evolved nodeB (eNB) 2011$a$, a Radio Network Controller (RNC) 2001$b$, a Domain Manager, (DM) 2001$c$, or an Element Manager (EM) 2001$d$.

Figure 3:
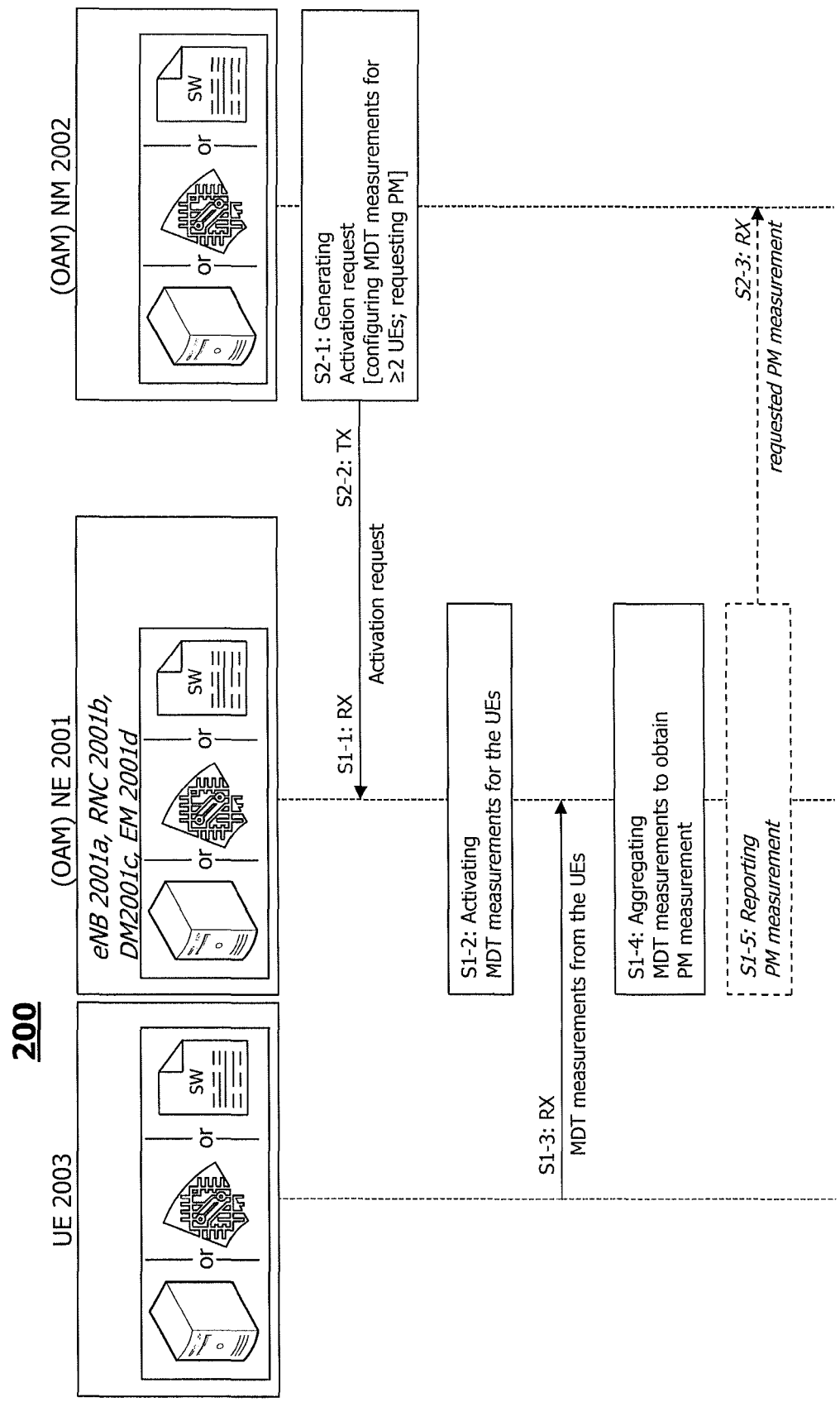
FIG. 3 shows a method embodiment which also reflects the interaction between the components of the device embodiment.

As shown in FIG. 3, the OAM NE 2001 comprises a core functionality (e.g., one or more of a Central Processing Unit (CPU), dedicated circuitry and/or a software module) 20011, an optional memory (and/or database) 20012, an optional transmitter 20013 and an optional receiver 20014. Moreover, the OAM NE 2001 comprises a first interface 20015, a second interface 20016, a third interface 20017 and an optional reporter 20018.

In turn, the OAM NM 2002 comprises a core functionality (e.g., one or more of a Central Processing Unit (CPU), dedicated circuitry and/or a software module) 20021, an optional memory (and/or database) 20022, an optional transmitter 20023 and an optional receiver 20024. Moreover, the OAM MN 2002 comprises a first interface 20025.

In the following paragraphs, assume that x=1 or 2. As partly indicated by the dashed extensions of the functional block of the CPUs 200x1, the first interface 20015, the second interface 20016, the third interface 20017 and the reporter 20018 (of the OAM NE 2001) as well as the first interface 20025 (of the OAM NM 2002) as well as the memory 200x2, the transmitter 200x3 and the receiver 200x4 may at least partially be functionalities running on the CPUs 200x1, or may alternatively be separate functional entities or means controlled by the CPUs 200x1 and supplying the same with information. The transmitter and receiver components 200x3, 200x4 may be realized to comprise suitable interfaces and/or suitable signal generation and evaluation functions.

The CPUs 200x1 may be configured, for example, using software residing in the memories 200x2, to process various data inputs and to control the functions of the memories 200x2, the transmitter 200x3 and the receiver 200x3 (as well as the first interface 20015, the second interface 20016, the third interface 20017 and the reporter 20018 (of the OAM NE 2001) as well as the first interface 20025 (of the OAM NM 2002)). The memory 200x2 may serve for storing program code for carrying out the methods according to the aspects disclosed herein, when executed by the CPUs 200x1.

It is to be noted that the transmitter 200x3 and the receiver 200x4 may be provided as an integral transceiver, as is indicated in FIG. 2. It is further to be noted that the transmitters/receivers 200x3, 200x4 may be implemented as physical transmitters/receivers for transceiving via an air interface or a wired connection, as routing/forwarding entities/interfaces between network elements, as functionalities for writing/reading information into/from a given memory area or as any suitable combination of the above. At least one of the above-described first interface 20015, second interface 20016, third interface 20017 and reporter 20018 (of the OAM NE 2001) as well as first interface 20025 (of the OAM NM 2002), or the respective functionalities, may also be implemented as a chipset, module or subassembly.

FIG. 3 shows a method embodiment which also reflects the interaction between the components of the device embodiment. In the signaling diagram of FIG. 3, time aspects between signaling are reflected in the vertical arrangement of the signaling sequence as well as in the sequence numbers. It is to be noted that the time aspects indicated in FIG. 3 do not necessarily restrict any one of the method steps shown to the step sequence outlined in FIG. 3. This applies in particular to method steps that are functionally disjunctive with each other.

Now turning to the second component (e.g. OAM NM 2002) of the Operation And Maintenance (OAM) system 200, in a step S2-1, the processor 20021 of the OAM NM 2002 performs generating an activation request configuring MDT measurements for a plurality of UEs 2003, and requesting a PM. The activation request may comply with 3GPP TS 32.422.

In step S2-2, the first interface 20025 (e.g. in cooperation with the transmitter 20023) performs transmitting the activation request towards the first component 2001, 2001$a$, 2001$b$ of the OAM system.

Then, in step S1-1, the first interface 20015 of the first component (e.g. OAM NE 2001, augmented by the receiver

20014) performs receiving the activation request configuring the MDT measurements for the plurality of UEs 2003, and requesting the PM.

Optionally, the activation request may comprise a job type parameter signalling the PM measurement request. In addition, the activation request may further comprise the request to report the MDT measurements on a non-aggregated per-UE basis. As first alternative, the method may further comprise activating the MDT measurements for specific UEs according to the measurement configuration indicated in an MDT trace job. As a second alternative, the received MDT measurement samples may be aggregated into PM measurements and reported as PM measurements to the OAM system. As a third alternative, the received MDT measurements may be reported on a non-aggregated per-UE basis as an MDT trace file to the OAM system.

In other words, the present disclosure may be based on extending the current MDT trace jobType parameter with new values corresponding to the PM originated MDT measurement collection. The new values to be added may be:

PM only (5);
PM and immediate MDT (6).

The "PM only" and the "PM and immediate MDT" job types may be applicable only in case of management based MDT activation both for UTRAN and E-UTRAN.

Optionally, there may be only one MDT trace job with the job type parameter "PM measurement request" (PM only) or "PM measurement and MDT measurement" (PM and immediate MDT) requested to be active at the same time in the same cell.

The "PM only" parameter may mean that the Radio Access Network (RAN) executes the requested measurements in the designated cells, including also the configuration of measurements at UEs 2003 when needed, but the measurements results are not stored in trace records and trace files. The measurement results are used only as input for corresponding PM measurements. A further difference is that the MDT measurements can be triggered for all UEs in the cell, irrespective of their user consent status. When the measurements are initiated for "PM only", the RAN may omit to request the UE to provide location information in the measurements.

Conversely, the "PM and immediate MDT" parameter may mean that the RAN executes the requested measurements for all UEs in the cell, similarly as in the "PM only" case and uses all measurement results as input for the corresponding PM measurements, but it also puts the results into trace records and into a trace file from all UEs from which user consent is available. For UEs that have not provided user consent, i.e., their measurements can be used only for PM purposes, the RAN may omit to request these UEs to provide location information in the measurements.

In a step S1-2, the second interface 20016 of the OAM NE 2001 performs activating the MDT measurements for the UEs.

The difference in the activation step may be when the OAM NE 2001 (e.g., RAN/RNC 2001b in case of UTRAN and eNodeB 2001a in case of E-UTRAN) initiates the measurements and records the collected measurements.

In case the jobType parameter indicates "PM-only" or "PM and immediate MDT" trace, the eNodeB 2001a or RNC 2001b may activate the requested MDT measurements for all UEs in the selected cells, as indicated in the areaScope parameter, irrespective of their user consent status.

In one example, there may be only one MDT trace job with type of "PM-only" or "PM and immediate MDT" allowed to be activated at the same time in a given cell. Otherwise, measurement samples from multiple MDT trace jobs with different measurement configurations would be mixed in the same PM counter.

In another example, multiple MDT trace jobs for PM measurements may be allowed to be activated in parallel.

In other words, activating multiple MDT trace jobs with type of "PM-only" or "PM and immediate MDT" may be allowed, in which case a further configuration attribute may be required in the MDT trace job configuration to indicate to which PM counter the measurement samples from the particular MDT trace job should be collected. For this reason, also multiple PM counters may be defined, one per supported parallel MDT trace job.

For example, when two MDT trace jobs with PM purposes are allowed in parallel, then there should be two PM counters defined, where "PM_counter1" collects and aggregates measurement samples from the first MDT PM trace job, while "PM_counter2" collects samples corresponding to the second MDT trace job.

In this case, the MDT trace job activation request for PM measurements may include an identity to uniquely identify the MDT trace job measurement configuration for PM measurements. In this case, separate PM measurements may be defined for each possible MDT trace job measurement configuration identity. In addition or alternatively, the MDT measurements samples corresponding to the MDT trace job configuration with the particular identity may be received and aggregated into the PM measurements of the same identity.

In an implementation example, in the MDT trace job, a configuration parameter, called for example PM configuration ID={1,2}, may be added to signal whether the measurement samples of the given MDT trace job should be collected into "PM_counter1" or "PM_counter2". The "PM configuration ID" parameter may be applicable only in case of trace jobs of type either "PM only" or "PM and immediate MDT".

In a step S1-3, the third interface 20017 of the OAM NE 2001 (e.g. in cooperation with the receiver 20014) performs receiving the MDT measurements from the UEs 2003. Finally, in a step S1-4, the processor 20011 of the OAM NE 2001 performs aggregating the MDT measurements to obtain the requested PM measurement.

In this case, when the eNodeB 2001a or RNC 2001b receives the MDT measurement report from the UE and the jobType indicates "PM only" collection, the eNodeB 2001a or RNC 2001b may use the received measurement report to update any relevant PM measurements (e.g. PM counters) that rely on the given MDT measurement as input data. The eNodeB 2001a or RNC 2001b might not store the received MDT measurement in trace records and should not produce a trace file.

In case the jobType indicates "PM and immediate MDT", the eNodeB 2001a or RNC 2001b may use the received measurement report to update any relevant PM measurements (e.g. PM counters), similarly as in the previous case. In addition, the eNodeB 2001a or RNC 2001b may check the user consent status of the UE generating the report and may store the received MDT measurement report in a trace record and put the report in a trace file in case the user consent is set (e.g., positive user consent).

In an optional step S1-5, the reporter 20018 of the OAM NE 2001 performs reporting the PM measurement. Accordingly, in an optional step S2-3, e.g. the receiver 20024 of the OAM NM 2002 performs receiving the requested PM measurement. The PM measurement and the PM measurement report may comply with 3GPP TS 32.425, 32.405 and/or 32.401.

Below, non-limiting examples are given for PM measurements for which MDT measurement samples may be used as input data (examples for E-UTRAN):

Reference Signal Received Power (RSRP) distribution measurements: The distribution of the RSRP values of MDT configured M1 measurements is meant. When the eNodeB 2001*a* receives a MeasurementReport message with MeasId IE corresponding to the MDT configured M1 measurement with rsrpResult IE included, eNB 2001*a* may increase the appropriate element of the RSRP distribution measurement corresponding to the value of the received rsrpResult IE.

It may be important that only measurement results corresponding to one specific measurement configuration, i.e., the one given in the MDT M1 configuration are included in the PM measurement, otherwise the collected samples may become biased and the distribution statistic will be useless.

Reference Signal Received Quality (RSRQ) distribution measurements: The distribution of the RSRQ values of MDT configured M1 measurements is meant. When the eNodeB 2001*a* receives a MeasurementReport message with MeasId IE corresponding to the MDT configured M1 measurement with rsrqResult IE included, eNB 2001*a* may increase the appropriate element of the RSRQ distribution measurement corresponding to the value of the received rsrqResult IE.

It would be possible to define other PM measurements based on other types of MDT data in a similar way. This disclosure can be applied for any PM measurements that use MDT measurement samples as input data according to the PM measurement definition.

Therefore, it could be applied for M1/M2 measurements, such as Received Signal Code Power (RSCP), Ec/N0, M3 measurements, such as Signal-Interference-Ratio, SIR, M4 measurements, such as UE power headroom, M5 measurements, such as received wideband power, M6 measurements, such as data volume, and M7 measurements, such as scheduled Internet Protocol (IP) throughput in case of UTRAN and for any new future MDT measurements. Similarly, it can be applied for other E-UTRAN MDT measurements as well, including M2 measurements, such as Power headroom, M3 measurements, such as Received Interference Power, M4 measurements, such as data volume, and M5 measurements, such as scheduled IP throughput and for any new future MDT measurements.

In case of measurements that do not require configuration and/or are measured in the network (i.e., not in the UE), the corresponding MDT measurements for PM counters may be collected by default, i.e., without requesting it in a trace job of type "PM only" or "PM and Immediate MDT".

In case no MDT measurement job with jobType "PM-only" or "PM and Immediate MDT" has been activated, then no measurement samples may be available for the corresponding PM counters, in which case the "suspect" flag may be set for the respective PM counters. The same behaviour may apply in cases when an MDT job with jobType either "PM-only" or "PM and Immediate MDT" has been initiated, but measurements required for specific PM counters has not been requested. In these cases, the "suspect" flag may be set only for those PM counters that lack the respective measurement configuration in the MDT job.

The present disclosure provides one or more of the following advantages:

Enabling configuring and initiating MDT measurements for PM purposes from the NM layer via Itf-N and thereby ensuring that the corresponding PM counters continuously receive measurement samples as input according to the desired measurement configuration.

Allowing the reduction of the amount of reported MDT data by reporting in PM format and by aggregating the data already in the NE, i.e., when detailed UE level information is not required by the use case.

Moreover, when the MDT measurements are ordered for PM aggregation purposes there is no privacy concern as data is not stored on per-UE level, only aggregated in PM counters. That is, MDT measurements could be initiated and collected for all UEs in a cell, independent of user consent status, thereby increasing the statistical relevance of collected data.

The proposed changes would impact the standard "UTRAN activation mechanism for area based MDT data collection without IMSI/IMEI(SV) selection", as well as, the "E-UTRAN activation mechanism for area based MDT data collections without IMSI/IMEI(SV) selection". The proposed additional actions would need to be added to the UE selection, as well as, to the measurement collection steps of the corresponding procedures.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method of operating a component of an Operation And Maintenance (OAM) system, the method comprising:
receiving an activation request configuring Minimization of Drive Test (MDT) measurements for a plurality of User Equipments (UEs), the activation request comprising a job type parameter signaling a Performance Measurement (PM) request, and requesting a PM measurement report;
activating the MDT measurements for the UEs;
receiving the MDT measurements from the UEs;
aggregating the received MDT measurements into PM measurements to obtain the requested PM measurement report to be reported to an OAM Network Manager (NM); and
reporting the PM measurement report,
wherein the PM measurement and the PM measurement report comply with at least one of 3rd Generation Partnership Project (3GPP) Technical Specification (TS) 32.425 for E-UTRAN PM measurements, 3GPP TS 32.405 for UTRAN measurements and 3GPP TS 32.401 for requirements for PM measurements.

2. The method of claim 1, wherein the activation request further comprises the request to report the MDT measurements on a non-aggregated per-UE basis.

3. The method of claim 1, further comprising activating the MDT measurements for specific UEs according to the measurement configuration indicated in an MDT trace job.

4. The method of claim 1, wherein there must be only one MDT trace job with the job type parameter "PM measurement request" or "PM measurement and MDT measurement requested" requested to be active at the same time in the same cell.

5. The method of claim 1, wherein multiple MDT trace jobs for PM measurements are allowed to be activated in parallel.

6. The method of claim 5, wherein the MDT trace job activation request for PM measurements includes an identity to uniquely identify the MDT trace job measurement configuration for PM measurements.

7. The method of claim 6, wherein separate PM measurements are defined for each possible MDT trace job measurement configuration identity.

8. The method of claim 5, wherein the MDT measurements samples corresponding to the MDT trace job configuration with the particular identity is received and aggregated into the PM measurements of the same identity.

9. The method of claim 1, wherein the MDT measurements are activated for UEs in a specified area.

10. The method of claim 9, wherein the MDT measurements are activated for all UEs in the specified area irrespective of their user consent status.

11. The method of claim 9, wherein the specified area comprises one or more cells of a cellular communication network.

12. The method of claim 1, wherein the activation request complies with 3GPP TS 32.422.

13. A method of operating a component of an Operation And Maintenance (OAM) system, the method comprising:
generating an activation request configuring Minimization of Drive Test (MDT) measurements for a plurality of User Equipments (UEs), the activation request comprising a job type parameter signaling a Performance Measurement (PM), and requesting a PM measurement report;
transmitting the activation request towards another component of the OAM system; and
receiving the requested PM measurement report, in which the MDT measurements had been aggregated into PM measurements,
wherein the PM measurement and the PM measurement report comply with at least one of 3rd Generation Partnership Project (3GPP) Technical Specification (TS) 32.425 for E-UTRAN PM measurements, 3GPP TS 32.405 for UTRAN measurements and 3GPP TS 32.401 for requirements for PM measurements.

14. A component of an Operation And Maintenance (OAM) system, the component comprising:
a first interface configured to receive an activation request configuring Minimization of Drive Test (MDT) measurements for a plurality of User Equipments (UEs), the activation request comprising a job type parameter signaling a Performance Measurement request, and requesting a PM measurement report;
a second interface configured to activate the MDT measurements for the UEs;
a third interface configured to receive the MDT measurements from the UEs;
a processor configured to aggregate the received MDT measurements into PM measurements to obtain the requested PM measurement report to be reported to an OAM Network Manager (NM); and
a reporter configured to report the PM measurement report,
wherein the PM measurement and the PM measurement report comply with at least one of 3rd Generation Partnership Project (3GPP) Technical Specification (TS) 32.425 for E-UTRAN PM measurements, 3GPP TS 32.405 for UTRAN measurements and 3GPP TS 32.401 for requirements for PM measurements.

15. The component of claim 14, configured as one of an OAM Network Element and a Network Element.

16. The component of claim 14, configured as one of an eNodeB, a Radio Network Controller (RNC), a Domain Manager (DM), and an Element Manager (EM).

17. An Operation And Maintenance (OAM) Network Manager component of an OAM system, the OAM Network Manager component comprising:
a processor configured to generate an activation request configuring Minimization of Drive Test (MDT) measurements for a plurality of User Equipments (UEs), the activation request comprising a job type parameter signaling a Performance Measurement (PM) request, and requesting a PM measurement report;
an interface configured to transmit the activation request towards another component of the OAM system; and
a receiver configured to receive the requested PM measurement report, in which the MDT measurements had been aggregated into PM measurements,
wherein the PM measurement and the PM measurement report comply with at least one of 3rd Generation Partnership Project (3GPP) Technical Specification (TS) 32.425 for E-UTRAN PM measurements, 3GPP TS 32.405 for UTRAN measurements and 3GPP TS 32.401 for requirements for PM measurements.

* * * * *